United States Patent [19]

Uher et al.

[11] Patent Number: 5,661,493

[45] Date of Patent: Aug. 26, 1997

[54] LAYERED DUAL FREQUENCY ANTENNA ARRAY

[75] Inventors: Jaroslav Uher, Pointe Claire; Ralph Pokuls, Beaconsfield, both of Canada

[73] Assignee: Spar Aerospace Limited, Quebec, Canada

[21] Appl. No.: 349,344

[22] Filed: Dec. 2, 1994

[51] Int. Cl.$^6$ ...................................................... H01Q 1/38
[52] U.S. Cl. ........................ 343/700 MS; 343/770
[58] Field of Search ........................... 343/700 MS, 725, 343/727, 846, 770

[56] References Cited

U.S. PATENT DOCUMENTS

| | | | |
|---|---|---|---|
| 4,097,868 | 6/1978 | Borowick | 343/727 |
| 4,816,835 | 3/1989 | Abiko et al. | 343/700 MS |
| 4,829,309 | 5/1989 | Tsukamoto et al. | 343/700 MS |
| 4,851,848 | 7/1989 | Wehner | 342/25 |
| 4,851,855 | 7/1989 | Tsukamoto et al. | 343/700 MS |
| 4,926,189 | 5/1990 | Zaghloul et al. | 343/700 MS |
| 4,929,959 | 5/1990 | Sorbello et al. | 343/700 MS |
| 4,977,406 | 12/1990 | Tsukamoto et al. | 343/700 MS |
| 5,160,936 | 11/1992 | Braun et al. | 343/700 MS |
| 5,241,321 | 8/1993 | Tsao | 343/700 MS |
| 5,262,791 | 11/1993 | Tsuda et al. | 343/700 MS |
| 5,270,721 | 12/1993 | Tsukamoto et al. | 343/700 MS |
| 5,332,999 | 7/1994 | Prati et al. | 342/25 |
| 5,400,042 | 3/1995 | Tulintseff | 343/727 |
| 5,534,877 | 7/1996 | Sorbello et al. | 343/700 MS |

FOREIGN PATENT DOCUMENTS 0 443 255 A2  6/1991  European Pat. Off. .

OTHER PUBLICATIONS

"Series-Fed-Type Linear Arrays of Dipole and Slot Elements Transversely Coupled to a Microstrip Line". A.N. Tulintseff, 1993 IEEE.

*Primary Examiner*—Donald T. Hajec
*Assistant Examiner*—Tan Ho
*Attorney, Agent, or Firm*—Chilton, Alix & Van Kirk

[57] ABSTRACT

A dual frequency array antenna comprises an upper layer including an array of antennas operating at a first frequency, a first ground layer disposed below the upper layer at a predetermined distance and a dielectric material disposed between the first ground layer and the upper layer. An array of slot radiator apertures are provided in the first ground layer. The apertures are spaced from the array of antennas and radiate at a second frequency. An array of feed lines is disposed at a predetermined distance below the first ground layer with one of the feed lines below each one of the apertures. A second ground plane layer is disposed at a predetermined distance below the array of feed lines. The two frequencies are, for example, from two distinct microwave bands.

18 Claims, 2 Drawing Sheets

LAYERED DUAL FREQUENCY ANTENNA ARRAY

TECHNICAL FIELD

The present invention relates to a dual frequency array antenna radiator or antenna. More particularly, the present invention relates to such an array antenna in which a first ground layer for an upper array of antennas is provided with an array of slots spaced from the array of antennas. The upper array of antennas can operate at a different frequency from the slot antennas for dual frequency operation.

BACKGROUND OF THE INVENTION

In radar microwave imaging of the earth's surface by satellite antennas, a phased array of antennas operating at frequencies in the range of 5–10 GHz form images with very good accuracy. Such antennas and imaging systems are known in the art.

In radar imaging and generally in the field of remote sensing, it is known to use dual frequency and dual polarization transceivers in order to be able to have different sensing characteristics, namely, different qualities of resolution and penetration. In particular, higher frequency X-band signals at 9.6 GHz are known for good resolution whereas C-band signals at 5.3 GHz are more capable of penetrating cloud although the imaging resolution is of lower quality.

A constraint of incorporating dual frequency operation into radar satellite antennas for remote imaging is largely physical space and weight. Lightweight and compact dual frequency radar antennas of good efficiency are not known in the art. U.S. Pat. No. 5,241,321 (Tsao) illustrates a microwave antenna in which a radiating patch is placed over a ground plane having a coupling slot for dual frequency circularly polarized radiation. U.S. Pat. No. 4,097,868 (Borowick) describes an antenna for combined surveillance and foliage penetration radar which operates at both X-band and L-band frequencies by providing L-band stripline dipole antennas on plates perpendicular to a flat plate waveguide slot array including broadwall slots for X-band transmission.

SUMMARY OF THE INVENTION

It is an object of the present invention to provide a dual polarization dual frequency antenna array (herein, an antenna array includes both a direct radiating array and a feed array for use in single or dual reflector systems) which is capable of operating at two frequencies with minimal interference between the two transmission systems. It is furthermore an object of the present invention to provide a flat array antenna in which two separate arrays operate at different frequencies with minimal interference between the arrays. It is yet another object of the present invention to provide such an antenna which is compact and lightweight. These objects are provided in part by providing a ground plane for an upper antenna array operating at a first frequency with the slot apertures of a lower antenna array, the slot apertures being spaced laterally from the upper antenna elements.

According to the invention, there is provided a dual frequency antenna array comprising an upper layer comprising an array of antennas operating at a first frequency, a first ground layer disposed below the upper layer at a predetermined distance, a dielectric material disposed between the first ground layer and the upper layer, an array of slot apertures provided in the first ground layer, the slot apertures being spaced from the array of antennas, an array of feed lines disposed at a predetermined distance below the first ground layer providing one of the feed lines below each one of the slot apertures, and a second ground layer disposed at a predetermined distance below the array of feed lines.

The antennas of the upper layer array of antennas are preferably arranged in a plurality of substantially parallel row of antennas. Similarly, the slot apertures in the first ground layer are preferably arranged in a plurality of rows which are substantially parallel to the rows of antennas. While the slot apertures can be oriented either parallel or orthogonal to the antennas, the slot apertures are preferably arranged to minimize interference (i.e. radio frequency coupling) between each antenna and the adjacent slot apertures.

Preferably, the array of antennas are square patch antennas connected to radiate with dual polarization. Also, the slot apertures may comprise two sets of slots arranged to radiate with orthogonal polarization. Of course, the array of antennas can also be an array of dipole antennas, and more particularly, a dual layer dipole array is preferred. The slot apertures are preferable radiating apertures, although they may alternatively be coupling slots for feeding a patch antenna disposed above the slots. Preferably, the first frequency is C-band (5.3 GHz) and the second frequency is X-band (9.6 GHZ), although other frequencies in the microwave range will also work well.

BRIEF DESCRIPTION OF THE DRAWINGS

The invention will be better understood by way of the following detailed description of a preferred embodiment with reference to the appended drawings in which.

DESCRIPTION OF PREFERRED EMBODIMENTS

Figure 1:
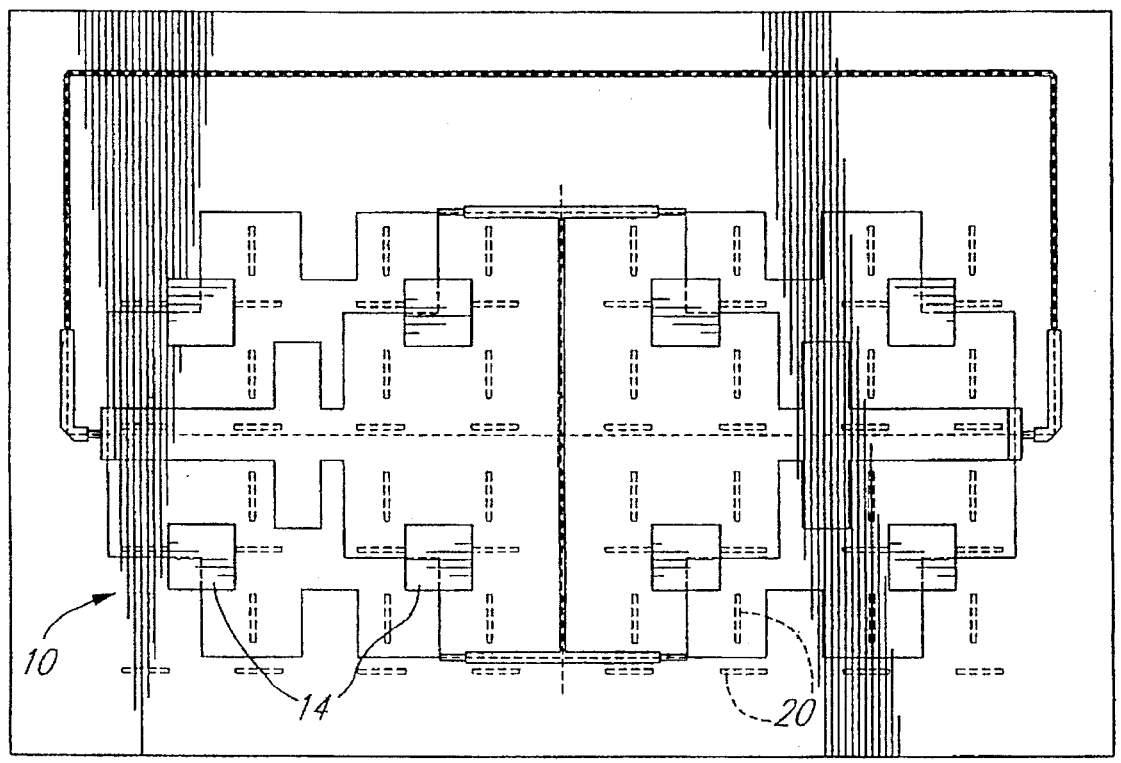
FIG.1 is a plan view of an array antenna element in accordance with the preferred embodiment.
Figure 2:
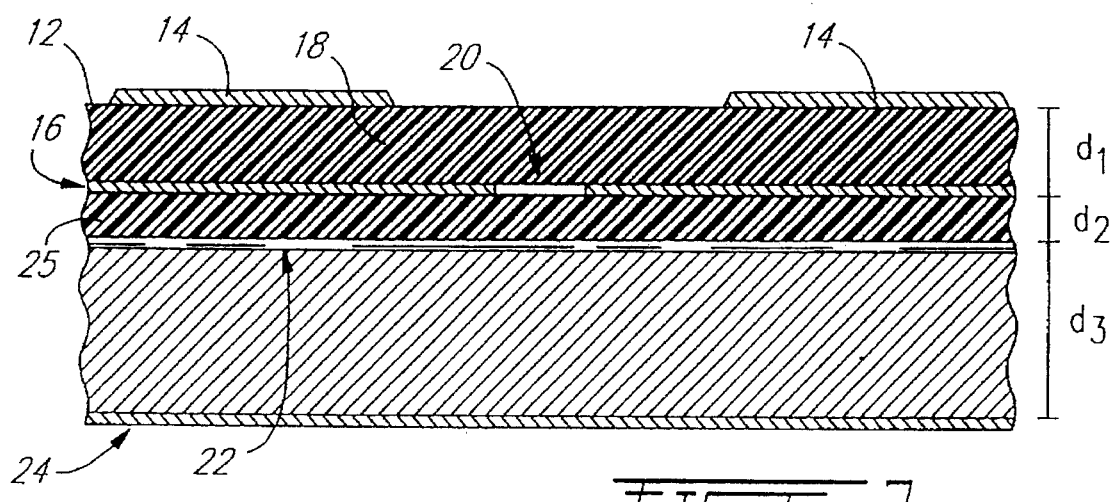
FIG. 2 is a vertical cross-section showing a detail of the layered construction of the array antenna of the preferred embodiment.

FIG. 1 illustrates an element of a microstrip array antenna 10 according to the preferred embodiment. An array of patch antennas 14 are provided for transmission of C-band radiation (5.3 GHz). As illustrated, the patches of antennas 14 are square and are fed by two separate orthogonal lines for operating the patch antennas in one of two orthogonal polarizations. The patch antennas 14 are provided in a matrix which is spaced from a matrix of slot apertures provided in the first ground plane 16 shown in FIG. 2. As is known in the art, the dielectric constant of material 18 (about 2.9) and the distance $d_1$ between patches 14 and ground layer 16 in accordance with the dimensions of patches 14 determine the transmission characteristics. Slots 20 are provided at a sufficient distance from patches 14 in order to interfere as little as possible with the transmission and reception between the different arrays. The slots 20 comprise two sets arranged in two different orthogonal directions parallel to the orthogonal directions of patches 14. The slot antennas 20 operate at 9.6 GHz (X-band) in a fashion well known in the art, namely feed lines 22 are provided below apertures 20 at a given distance $d_2$. To direct radiation, a second ground plane 24 is placed at a given distance $d_3$ from feed lines 22.

Figure 3:
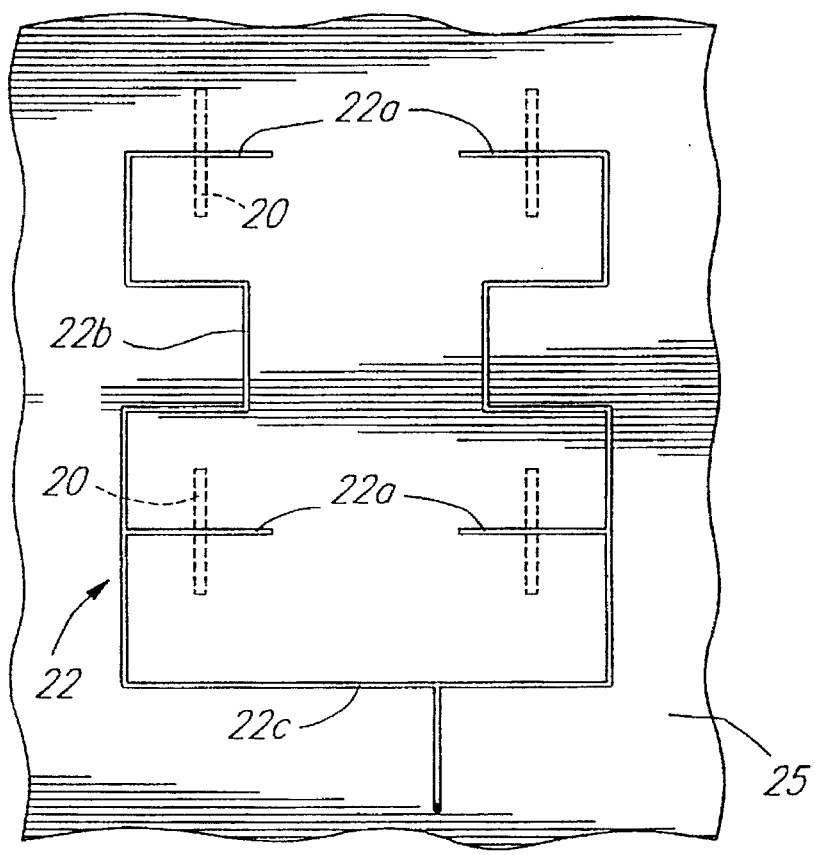
FIG. 3 is a detailed view illustrating the feed lines supplying a group of four slot apertures of one polarization.

The feed lines 22 illustrated in greater detail in FIG. 3 are conductive strips provided on the lower surface of a dielectric material 25. The dimensions and shape of feed lines 22 are important for efficient operation. At the resonant frequency of operation, the end portions 22a are of a given length so that the maximum electric field coupling occurs under apertures 20. This means that the length of portions 22a are a quarter wavelength long between the apertures and the ends, as is known in the art. The lengths of the feed lines between the various end portions in a feed line group fed by a trunk line 22c are selected to feed each feed line end portion 22a in phase with one another. Additionally, detour bend portions 22b are provided so that the feed lines circumnavigate an area where the feed lines pass for the orthogonal set of slots in the slot array.

As can be appreciated from FIG. 1, the lines feeding patches 14 are of a predetermined path length in order to feed all patches 14 in phase at the resonant frequency.

As can also be appreciated, the two sets of orthogonal lines for array 14 or array 20 are selectively powered for the purposes of transmitting in one of the two polarizations. The antenna thus provides a dual polarization and dual frequency array. The ground layer 16 also effectively shields radiation generated by the two signal distribution networks (SDN). This has the advantage that minimal interference between the two different frequency array antennas occurs during operation.

Figure 4:
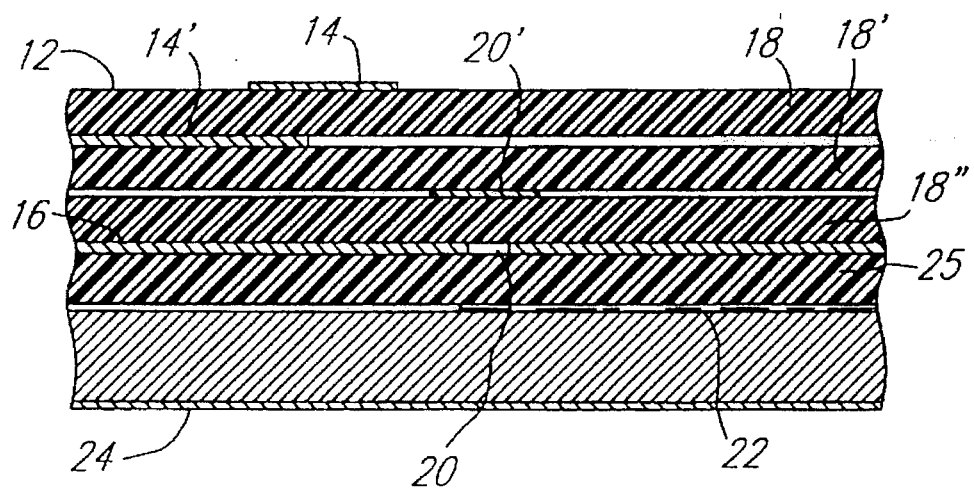
FIG. 4 is a vertical cross-section showing a detail of the layered construction of a dual layer dipole array/slot coupled patch array antenna.

In the embodiment of the invention shown in FIG. 4, a variant arrangement is provided. The upper antenna array comprises a dipole array 14 on an upper surface 12, with SDN 14' of the dipole array 14 being provided on an intermediate layer 12'. The slot apertures 20 do not directly radiate, but rather they are coupling slots for patches 20'. The SDN 22 is arranged to feed the coupling slots 20. As illustrated, the dielectric used at 18, 18', 18" and 25 is Duroid (™) and the dielectric used between the patch SDN 22 and the ground plane 24 is Nomex (™). As can be appreciated, a lower radiating slot array can also be arranged with the upper dipole array.

It is to be understood that the present invention is not to be limited by the above description of the preferred embodiment. By way of example only, some of the preferred dimensions and materials for constructing the array antenna panel of the preferred embodiment are set out herein below.

We claim:

1. A dual frequency and dual polarization array antenna comprising:

an upper layer comprising an array of antennas operating at a first frequency, said array of antennas comprising a plurality of antennas being arranged in a plurality of substantially parallel rows, said rows defining a direction;

a first ground layer disposed below said upper layer at a predetermined distance;

a dielectric material disposed between said first ground layer and said upper layer;

an array of slot apertures provided in said first ground layer, said array of slot apertures comprising a plurality of slot apertures being laterally spaced from said antennas and arranged in a plurality of rows which are substantially parallel to said rows of antennas, at least some of said rows of slot apertures being substantially coincident with said rows of antennas, each of said rows of slot apertures including slot apertures which are oriented in one direction, said one direction being either substantially parallel or substantially orthogonal to the direction of said rows of antennas and being different from said one direction of said slot apertures of each adjacent row of slot apertures, said slot apertures of all of said substantially coincident rows of slot apertures being oriented substantially orthogonal to said antennas of said substantially coincident rows of antennas;

an array of feed lines disposed at a predetermined distance below said first ground layer, one of said feed lines being at least in part in registration with each of said apertures; and a second ground layer disposed a predetermined distance below said array of feed lines.

2. The antenna array as claimed in claim 1, wherein said slot apertures are radiating apertures.

3. The antenna array as claimed in claim 2, wherein said antenna radiates microwave radiation.

4. The antenna array as claimed in claim 1, wherein said upper layer array of antennas comprises an array of dipole antennas.

5. The antenna array as claimed in claim 4, wherein said dipole antennas are fed by a signal distribution network provided on a layer below said upper layer.

6. The antenna array as claimed in claim 4, wherein each of said dipole antennas is oriented substantially orthogonal to the direction of said rows of antennas and wherein said slot apertures of all of said substantially coincident rows of slot apertures are oriented substantially parallel to the direction of said rows of antennas.

7. The antenna array as claimed in claim 4, wherein each of said dipole antennas is oriented substantially parallel to the direction of said rows of antennas and wherein said slot apertures of all of said substantially coincident rows of slot apertures are oriented substantially orthogonal to the direction of said rows of antennas.

8. The antenna array as claimed in claim 1, wherein said slot apertures are coupling slots for coupling with patch antennas provided on a layer disposed at a predetermined distance above said slots.

9. The antenna array as claimed in claim 1, wherein said antenna radiates microwave radiation.

10. The antenna array as claimed in claim 9, wherein said first frequency is about 5.3 GHz and a second frequency of said slot apertures is about 9.6 GHz.

11. The antenna array as claimed in claim 1, wherein said upper layer array of antennas comprises an array of square patch antennas, each of said patch antennas being fed by two orthogonal feed lines on the sides of said patch antennas.

12. The antenna array as claimed in claim 11, wherein said antenna radiates microwave radiation.

13. The antenna array as claimed in claim 12, wherein said first frequency is about 5.3 GHz and a second frequency of said slot apertures is about 9.6 GHz.

14. The antenna array as claimed in claim 12, wherein said antenna array is a microstrip antenna array.

15. The antenna array as claimed in claim 11, wherein each of said slot apertures of all of said substantially coincident rows of slot apertures are oriented substantially parallel to the direction of said rows of antennas.

16. A dual frequency and dual polarization array antenna comprising:

an upper layer comprising an array of antennas operating at a first frequency, said array of antennas comprising a plurality of antennas which are arranged in a plurality of substantially parallel rows, said rows defining a direction;

a first ground layer disposed below said upper layer at a predetermined distance;

a dielectric material disposed between said first ground layer and said upper layer;

an array of slot apertures provided in said first ground layer, said array of slot apertures comprising a plurality of slot apertures being laterally spaced from said antennas and arranged in a plurality of rows which are substantially parallel to and positioned at least one of either in between or substantially coincident with said rows of antennas, each of said rows of slot apertures including slot apertures which are oriented in one direction, said one direction being either substantially parallel or substantially orthogonal to the direction of said rows of antennas, said slot apertures of all of said substantially coincident rows of slot apertures being oriented relative to said antennas of said substantially coincident rows of antennas to reduce interference therebetween;

an array of feed lines disposed at a predetermined distance below said first ground layer, one of said feed lines being at least in part in registration with each of said slot apertures;and a second ground layer disposed a predetermined distance below said array of feed lines.

17. An antenna array as claimed in claim 16, wherein said one direction of said slot apertures of each of said rows of apertures is different from said one direction of said slot apertures of each adjacent row of slot apertures.

18. The antenna array as claimed in claim 16, wherein said upper layer array of antennas comprises an array of square patch antennas, each of said patch antennas being fed by two orthogonal feed lines on the sides of said patch antennas, and wherein each of said slot apertures of all of said substantially coincident rows of slot apertures are oriented substantially parallel to the direction of said rows of antennas.

* * * * *